United States Patent
Terauchi et al.

(10) Patent No.: US 12,429,378 B2
(45) Date of Patent: Sep. 30, 2025

(54) RESIN PROPERTY VALUE PREDICTION APPARATUS, LEARNING APPARATUS, AND METHOD FOR PREDICTING RESIN PROPERTY VALUE

(71) Applicants: DIC Corporation, Tokyo (JP); MEIJI UNIVERSITY, Tokyo (JP)

(72) Inventors: Kazutoshi Terauchi, Sakura (JP); Toshinori Yamaji, Sakura (JP); Hiromasa Kaneko, Kawasaki (JP); Shuto Yamakage, Kawasaki (JP)

(73) Assignees: DIC CORPORATION, Tokyo (JP); MEIJI UNIVERSITY, Tokyo (JP)

( * ) Notice: Subject to any disclaimer, the term of this patent is extended or adjusted under 35 U.S.C. 154(b) by 295 days.

(21) Appl. No.: 18/118,830

(22) Filed: Mar. 8, 2023

(65) Prior Publication Data
US 2023/0288257 A1    Sep. 14, 2023

(30) Foreign Application Priority Data

Mar. 14, 2022 (JP) .................................. 2022-039661

(51) Int. Cl.
*G01J 3/44*     (2006.01)
*G01N 21/65*   (2006.01)

(52) U.S. Cl.
CPC ............ *G01J 3/4412* (2013.01); *G01N 21/65* (2013.01)

(58) Field of Classification Search
CPC ........... G01J 3/4412; G01J 3/44; G01N 21/65
See application file for complete search history.

(56) References Cited

U.S. PATENT DOCUMENTS

| | | | |
|---|---|---|---|
| 2007/0222100 A1* | 9/2007 | Husted | B27N 3/08 264/408 |
| 2020/0393363 A1 | 12/2020 | Ren et al. | |

FOREIGN PATENT DOCUMENTS

| | | |
|---|---|---|
| JP | 2001-106703 A | 4/2001 |
| JP | 2016-161421 A | 9/2016 |
| JP | 2016-538536 A | 12/2016 |
| JP | 2021-521463 A | 8/2021 |
| JP | 2021-529935 A | 11/2021 |
| JP | 2022-509222 A | 1/2022 |
| WO | 2015/075629 A1 | 5/2015 |
| WO | 2019/195737 A1 | 10/2019 |
| WO | 2020/109601 A1 | 6/2020 |

OTHER PUBLICATIONS

Office Action dated Aug. 6, 2024, issued in counterpart JP Application No. 2022-039661, with English translation. (8 pages).

* cited by examiner

*Primary Examiner* — Georgia Y Epps
*Assistant Examiner* — Don J Williams
(74) *Attorney, Agent, or Firm* — WHDA, LLP (57) ABSTRACT

To calculate the properties of a resin composition in a short time and with high accuracy, a resin property value prediction apparatus includes an acquisition unit acquiring spectral data obtained by measuring a resin composition by a spectroscopic sensor in a process of performing a resin polymerization reaction in a batch type reaction tank and a calculation unit, using a learned model learned with spectral data obtained by measuring the resin composition in advance and a resin property value as training data, calculating the resin property value of the resin composition having the spectral data acquired by the acquisition unit.

10 Claims, 8 Drawing Sheets

|  |  | BC<br>BASIC CONDITION | IC1<br>CONDITION 1 | IC2<br>CONDITION 2 | IC3<br>CONDITION 3 | IC4<br>CONDITION 4 | IC5<br>CONDITION 5 | IC6<br>CONDITION 6 | IC7<br>CONDITION 7 | IC8<br>CONDITION 8 |
|---|---|---|---|---|---|---|---|---|---|---|
| DROPPING STEP | TEMPERATURE [°C] | 115 | 110 | 120 | 115 | 115 | 115 | 115 | 110 | 120 |
|  | TIME [h] | 5 | 5 | 5 | 4 | 6 | 5 | 5 | 5 | 5 |
| HOLDING STEP | TEMPERATURE [°C] | 115 | 110 | 120 | 115 | 115 | 110 | 120 | 115 | 115 |
|  | TIME [h] | 4 | 4 | 4 | 4 | 4 | 4 | 4 | 4 | 4 |

| | GARDNER VISCOSITY [mPa·s] | NV [wt%] | REMAINING MONOMER CONCENTRATION [wt%] | MOLECULAR WEIGHT |
|---|---|---|---|---|
| SMOOTHING PROCESSING | PRESENT | PRESENT | PRESENT | PRESENT |
| DIFFERENTIATING PROCESSING | PRESENT | PRESENT | PRESENT | PRESENT |
| LOGARITHMIC TRANSFORMATION PROCESSING | PRESENT | PRESENT | ABSENT | PRESENT |
| ERROR | ±8.3 | ±0.49 | ±5.4 | ±2.5 |
| $R^2$ | 0.958 | 0.996 | 0.975 | 0.696 |

FIG. 12

|  | GARDNER VISCOSITY [mPa·s] | NV [wt%] | REMAINING MONOMER CONCENTRATION [wt%] | MOLECULAR WEIGHT |
|---|---|---|---|---|
| SMOOTHING PROCESSING | PRESENT | PRESENT | PRESENT | PRESENT |
| DIFFERENTIATING PROCESSING | ABSENT | ABSENT | ABSENT | ABSENT |
| LOGARITHMIC TRANSFORMATION PROCESSING | PRESENT | PRESENT | ABSENT | PRESENT |
| ERROR | ±11.8 | ±0.85 | ±6.9 | ±5.5 |
| $R^2$ | 0.945 | 0.992 | 0.962 | −0.077 |

FIG. 13

|  | GARDNER VISCOSITY [mPa·s] | NV [wt%] | REMAINING MONOMER CONCENTRATION [wt%] | MOLECULAR WEIGHT |
|---|---|---|---|---|
| SMOOTHING PROCESSING | PRESENT | PRESENT | PRESENT | PRESENT |
| DIFFERENTIATING PROCESSING | ABSENT | ABSENT | ABSENT | ABSENT |
| LOGARITHMIC TRANSFORMATION PROCESSING | PRESENT | PRESENT | ABSENT | PRESENT |
| ERROR | ±15.3 | ±1.04 | ±7.0 | ±5.3 |
| $R^2$ | 0.854 | 0.990 | 0.934 | 0.054 |

FIG. 14

|  | GARDNER VISCOSITY [mPa·s] | NV [wt%] | REMAINING MONOMER CONCENTRATION [wt%] | MOLECULAR WEIGHT |
|---|---|---|---|---|
| SMOOTHING PROCESSING | PRESENT | PRESENT | PRESENT | PRESENT |
| DIFFERENTIATING PROCESSING | ABSENT | ABSENT | ABSENT | ABSENT |
| LOGARITHMIC TRANSFORMATION PROCESSING | PRESENT | PRESENT | ABSENT | PRESENT |
| ERROR | ±13.7 | ±1.41 | ±4.9 | ±5.2 |
| $R^2$ | 0.820 | 0.971 | 0.981 | 0.083 |

RESIN PROPERTY VALUE PREDICTION APPARATUS, LEARNING APPARATUS, AND METHOD FOR PREDICTING RESIN PROPERTY VALUE

BACKGROUND OF THE INVENTION

1. Field of the Invention

The present invention relates to a resin property value prediction apparatus, a learning apparatus, and a method for predicting a resin property value.

2. Description of the Related Art

Conventionally, a technique has been known that, in a process of performing a polymerization reaction using a batch type reaction tank, performs control based on measured process data in order to maintain uniform quality of products (see PTL 1, for example).

A technique has been known for, in the production process of a polymer, calculating the quality of the polymer based on the Raman spectrum of the polymer in order to reduce the time required for the entire process including sampling and inspection (see PTL 2, for example).

PTL 1: Japanese Unexamined Patent Application Publication No. 2001-106703
PTL 2: Japanese Unexamined Patent Application Publication No. 2021-521463

SUMMARY OF THE INVENTION

The method of process control such as the one disclosed in PTL 1 has a problem in that it requires performing sampling and property inspection work and thus takes a long time for process control.

When using the technique such as the one disclosed in PTL 2, the time may be able to be reduced because of the use of machine learning algorithms, but the prediction accuracy is about ±20% and cannot perform prediction with high accuracy. If the property values of a resin composition do not meet quality thresholds due to prediction accuracy, corrective measures such as re-analysis and readjustment of polymerization conditions are required. The corrective measures require cost and labor, are problematic in causing reduced productivity, and in some cases require disposal of polymerized products.

That is, the conventional techniques have a problem in that calculation of the properties of the resin composition requires labor and time, and even when machine learning is used, the prediction accuracy is low.

Given these circumstances, an object of the present invention is to provide a technique that can calculate the properties of a resin composition in a short time and with high accuracy.

The inventors of the present invention have earnestly conducted study in order to achieve the above object to find out that a machine learning algorithm can calculate the properties of a resin composition in a short time and with high accuracy and completed the present invention.

Specifically, the present invention has the following aspects.

A resin property value prediction apparatus according to an aspect of the present invention includes an acquisition unit acquiring spectral data obtained by measuring a resin composition by a spectroscopic sensor in a process of performing a resin polymerization reaction in a batch type reaction tank and a calculation unit, using a learned model learned with spectral data obtained by measuring the resin composition in advance and a resin property value as training data, calculating the resin property value of the resin composition having the spectral data acquired by the acquisition unit.

In the resin property value prediction apparatus according to an aspect of the present invention, the spectral data included in the training data is spectral data obtained by performing smoothing processing on spectral data measured by the spectroscopic sensor in advance, and the calculation unit further includes a preprocessing unit performing smoothing processing on the spectral data acquired by the acquisition unit and calculates the resin property value based on the spectral data with the smoothing processing performed by the preprocessing unit.

In the resin property value prediction apparatus according to an aspect of the present invention, the spectral data included in the training data is spectral data obtained by performing differentiating processing on spectral data measured by the spectroscopic sensor in advance, the preprocessing unit further performs differentiating processing on the spectral data acquired by the acquisition unit, and the calculation unit calculates the resin property value based on the spectral data with the differentiating processing performed by the preprocessing unit.

In the resin property value prediction apparatus according to an aspect of the present invention, the preprocessing unit performs the smoothing processing on the spectral data acquired by the acquisition unit and the differentiating processing on the spectral data acquired by the acquisition unit independently from each other, and the calculation unit calculates the resin property value based on any of the spectral data with the smoothing processing performed by the preprocessing unit, the spectral data with the differentiating processing performed by the preprocessing unit, and spectral data with neither the smoothing processing nor the differentiating processing performed by the preprocessing unit.

In the resin property value prediction apparatus according to an aspect of the present invention, the calculation unit performs logarithmic transformation processing on the resin property value independently from the smoothing processing and the differentiating processing and outputs either the resin property value with the logarithmic transformation processing performed or the resin property value without the logarithmic transformation processing performed.

In the resin property value prediction apparatus according to an aspect of the present invention, the preprocessing unit performs the smoothing processing by local regression with a window length of less than 41.

In the resin property value prediction apparatus according to an aspect of the present invention, the acquisition unit acquires spectral data measured after a sampled resin composition is allowed to cool for a certain time.

In the resin property value prediction apparatus according to an aspect of the present invention, the acquisition unit acquires spectral data measured at every certain time while the resin polymerization reaction is being performed in the batch type reaction tank.

In the resin property value prediction apparatus according to an aspect of the present invention, the resin composition is an acrylic resin, and the acquisition unit acquires spectral data obtained by measuring the acrylic resin by the spectroscopic sensor.

In the resin property value prediction apparatus according to an aspect of the present invention, the spectroscopic sensor measuring the spectral data acquired by the acquisition unit is at least either a near-infrared (NIR) spectroscopic sensor or a Raman spectroscopic sensor.

A learning apparatus according to an aspect of the present invention is, with spectral data obtained by measuring a resin composition sampled in a process of performing a resin polymerization reaction in a batch type reaction tank by a spectroscopic sensor and a resin property value of the resin composition as training data, trained to predict the resin property value corresponding to the spectral data.

The learning apparatus according to an aspect of the present invention performs first learning based on the same training data by a plurality of machine learning algorithms and selects any one of a plurality of results with the first learning performed.

A method for predicting a resin property value according to an aspect of the present invention has an acquisition step acquiring spectral data obtained by measuring a resin composition sampled in a process of performing a resin polymerization reaction in a batch type reaction tank by a spectroscopic sensor and a calculation step, using a learned model learned with spectral data obtained by measuring the resin composition in advance and a resin property value as training data, calculating the resin property value of the resin composition having the spectral data acquired at the acquisition step.

The present invention can provide a technique that can calculate the properties of a resin composition in a short time and with high accuracy.

DETAILED DESCRIPTION OF EMBODIMENTS

Outline of Resin Property Value Prediction System

The following describes a resin property value prediction system 1 according to an embodiment of the present invention with reference to the accompanying drawings. The following first describes matters as the premise of the resin property value prediction system 1 according to the present embodiment. The resin property value prediction system 1 is used to measure the properties of a resin composition in a resin polymerization process.

The resin composition according to the present embodiment broadly includes polymers such as homopolymers and copolymers. The resin composition may be a thermoplastic resin or a thermosetting resin. The thermoplastic resin is not limited to a particular resin. Examples thereof include polypropylene (PP), polyethylene (PE), ABS resins, polyvinyl chloride (PVC), acrylic resins, polyester resins, polystyrene resins (PS), urethane resins (PU), and polyphenylene sulfide resins (PPS). The following embodiment describes, as an example, a case in which the resin composition is an acrylic resin, and prediction is performed using a solution containing the acrylic resin (hereinafter, the form of the solution containing the resin composition is also referred to as a "resin product").

The properties of the resin composition according to the present embodiment broadly include a non-volatile (NV) value, a viscosity, a remaining monomer concentration, and a molecular weight. In the following description, the properties of the resin composition may also be described as a resin property value or polymer liquid properties. The following describes examples of a method for measuring the resin property value according to the present embodiment. The properties of the resin composition according to the present embodiment are not limited to the examples described above and may be measured by methods other than methods of measurement described below.

The following describes a method for measuring the NV value (the amount of non-volatile components). First, a sampled resin composition is collected in an aluminum dish, which has been weighed in advance, and is weighed. It is then diluted to 20 [wt % (weight percent)] by adding a diluent solvent containing toluene and methanol and is then heated using an oven heated at 108[° C.] for 1 hour to remove volatile components. The resin composition residue remaining on the aluminum dish after heating is weighed, and the amount of the non-volatile components is measured from the difference with the weight before heating.

The following describes a method for measuring the viscosity. First, a certain amount of a sampled resin composition is added to a Gardner bubble viscosity tube, which is then sealed. The sealed viscosity tube is immersed in a water bath controlled at 25[° C.] to adjust the temperature of the resin composition. Subsequently, the closest standard viscosity sample is determined by comparing bubble rise rates, and the viscosity is quantified using a standard viscosity conversion table.

The following describes a method for measuring the remaining monomer concentration. First, a sampled resin composition is diluted to 0.5 [wt %] using N,N-dimethylformamide to prepare a measurement sample. A monomer amount in the resin composition is measured using gas chromatography having an FID detector. The remaining monomer concentration is measured from the total amount of all the monomers.

The following describes a method for measuring the molecular weight. First, a sampled resin composition is diluted to 0.2 [wt %] by adding tetrahydrofuran to prepare a measurement sample. From this measurement sample, using gel permeation chromatography having a differential refraction detector, the molecular weight is measured as a molecular weight in terms of polystyrene.

Figure 1:
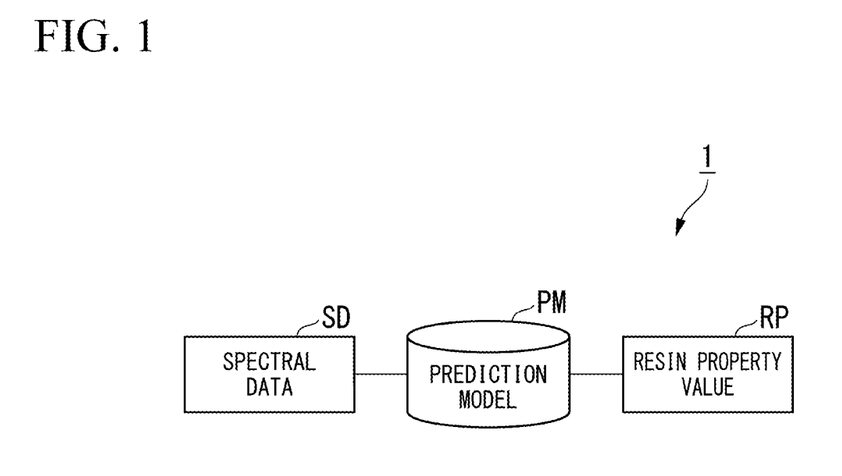
FIG. 1 is a diagram for illustrating a resin property value prediction system according to the present embodiment.

FIG. 1 is a diagram for illustrating the resin property value prediction system according to the present embodiment. The following describes an outline of the resin property value prediction system 1 with reference to the drawing.

The resin property value prediction system 1 includes a prediction model PM. The prediction model PM is a learned model having been learned in advance to predict a resin property value RP based on spectral data SD. In other words, the prediction model PM is a learned model in which the spectral data SD is an explanatory variable X, whereas the resin property value RP is an objective variable Y.

The resin property value prediction system 1 predicts the resin property value RP based on the spectral data SD measured by either offline measurement or online measurement.

The resin property value RP may specifically be the NV value, the viscosity, the remaining monomer concentration, the molecular weight, or the like.

The spectral data SD is acquired from a sampled resin composition using a near-infrared sensor (an NIR sensor) or a Raman spectroscopic sensor (a Raman spectrophotometer). The following describes examples of the spectral data SD acquired using the NIR sensor or the Raman spectroscopic sensor with reference to FIG. 2 and FIG. 3.

Figure 2:
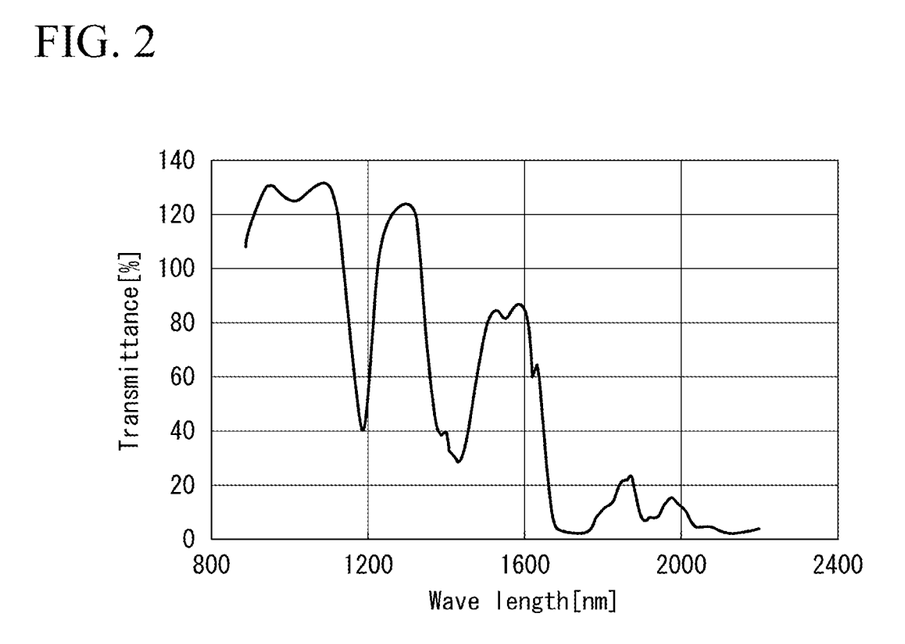
FIG. 2 is a diagram of an NIR spectrum as an example of spectral data according to the present embodiment.

FIG. 2 is a diagram of an NIR spectrum as an example of the spectral data according to the present embodiment. The following describes an example of the spectral data SD acquired by the NIR sensor with reference to the drawing. The horizontal axis in the drawing shows wavelength [nm (nanometer)], whereas the vertical axis shows transmittance [%].

The drawing illustrates an example of the spectral data SD measured immediately after a monomer dropping step ends.

As illustrated in FIG. 2, when the NIR sensor is used, the spectral data SD shows the transmittance at each wavelength. In this case, the prediction model PM uses the transmittance at each wavelength as the explanatory variable X to perform learning and prediction. In this case, the number of data contained in one piece of spectral data SD may be about 1,300.

Figure 3:
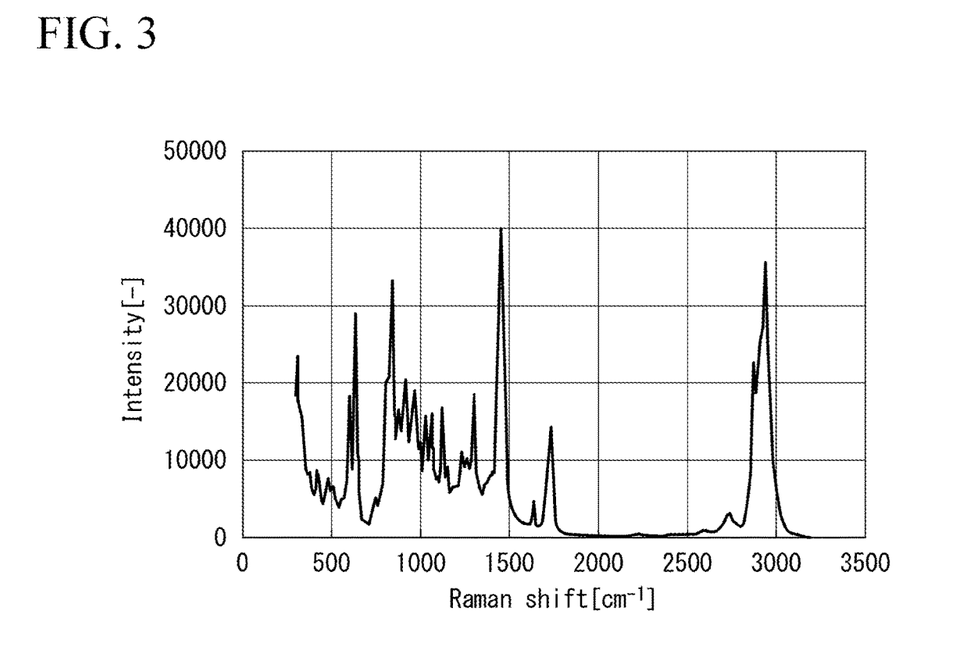
FIG. 3 is a diagram of a Raman spectrum as an example of the spectral data according to the present embodiment.

FIG. 3 is a diagram of a Raman spectrum as an example of the spectral data according to the present embodiment. The following describes an example of the spectral data SD acquired by the Raman spectroscopic sensor with reference to the drawing. The horizontal axis in the drawing shows Raman shift [$cm^{-1}$], whereas the vertical axis shows scattering intensity [arbitrary units].

The drawing illustrates an example of the spectral data SD measured immediately after a monomer dropping step ends.

As illustrated in FIG. 3, when the Raman spectroscopic sensor is used, the spectral data SD shows the scattering intensity at each Raman shift. In this case, the prediction model PM uses the scattering intensity at each Raman shift as the explanatory variable X to perform learning and prediction. In this case, the number of data contained in one piece of spectral data SD may be about 2,900.

In the example illustrated in the drawing, the horizontal axis is set to the Raman shift [$cm^{-1}$], showing Stokes scattering observed in a longer wavelength region than incident light, but wavelength [nm] may be used as the horizontal axis in place of the Raman shift.

In a learning stage and a prediction stage (an inference stage), the spectral data SD may be acquired by either of methods of measurement, or the offline measurement and the online measurement.

The offline measurement refers to collecting a sample from a resin composition during reaction in a polymerization reaction vessel and measuring the spectral data SD after a lapse of a certain period. Specifically, first, the resin composition sampled from the polymerization reaction vessel is collected in a glass container and is allowed to cool to room temperature overnight. After cooling, the NIR sensor or the Raman spectroscopic sensor is inserted into the collected resin composition to measure the spectrum thereof to perform the offline measurement.

The online measurement refers to collecting a sample from a resin composition during reaction in a polymerization reaction vessel and measuring the spectral data SD in real time. Specifically, the NIR sensor or the Raman sensor is installed in the polymerization reaction vessel, and a spectrum is measured at each specified time while acrylic resin synthesis is performed with the NIR sensor or the Raman sensor inserted into a polymerization liquid to perform the online measurement.

Figure 4:
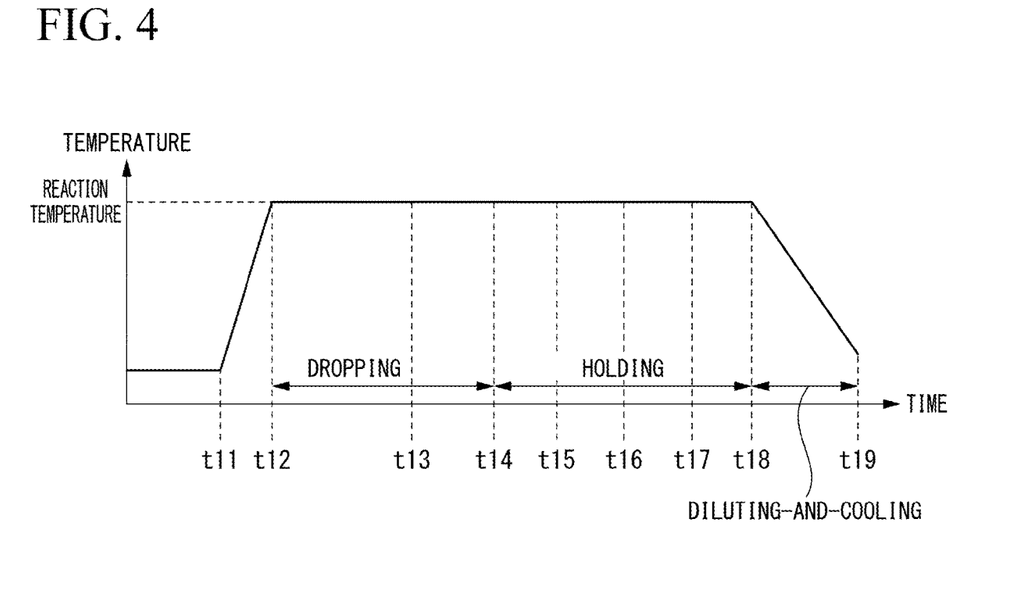
FIG. 4 is a diagram for illustrating online measurement according to the present embodiment.

FIG. 4 is a diagram for illustrating the online measurement according to the present embodiment. The following describes an example of sampling timing in the online measurement with reference to the drawing. The drawing illustrates a temporal change in the temperature of a polymerization reaction tank with the temperature of the polymerization reaction tank on the vertical axis and time on the horizontal axis.

The polymerization reaction tank is a reaction vessel, not shown, for example, and steam or the like is sprayed onto the reaction vessel, for example, to control the temperature of a sample housed in the reaction vessel. The temperature of the polymerization reaction tank refers to the temperature of the reaction vessel itself or the temperature inside the reaction vessel. The temperature of the sample housed in the reaction vessel may be controlled by submerging the reaction vessel in a certain temperature-controlled oil bath. In this case, the temperature of the polymerization reaction tank may be the temperature of the oil bath heating the reaction vessel.

First, at time t11, the temperature in the reaction vessel is increased. At time t12, when the temperature reaches a certain reaction temperature (115 [° C.], for example), the temperature of the oil bath is kept constant.

From time t12 to time t14, a dropping step, in which a monomer and a polymerization initiator are dropped, is performed. The present polymerization reaction is an exothermic reaction, and thus the reaction vessel is cooled with cooling water or the like as needed to maintain the temperature of the sample housed in the reaction vessel. The dropping step may be 5 hours, for example. During the dropping step, one piece of sampling is performed. In the example illustrated in FIG. 4, sampling is performed at time t13.

The monomer used to produce the acrylic resin is not limited to a particular monomer, and known ones can be used. Examples of the monomer include acrylic acid, alkyl acrylates, methacrylic acid, and alkyl methacrylates.

The polymerization initiator used to produce the acrylic resin is not limited to a particular polymerization initiator, and known ones can be used. Examples of the polymerization initiator include persulfates such as ammonium persulfate and potassium persulfate; hydrogen peroxide; azo compounds; and organic oxides such as (2-ethylhexanoyl) (tert-butyl) peroxide.

In the dropping step, in an initiation reaction, radicals are produced by thermal decomposition or the like of the polymerization initiator. In a growth reaction, the radicals produced in the initiation reaction sequentially react with the monomer to produce polymer radicals, and furthermore, the polymer radicals and the monomer react with each other to produce the acrylic resin as the resin composition.

After the dropping step ends, from time t14 to time t18, a holding step, in which the temperature is held at a certain temperature, is performed. This holding step is a period during which a remaining monomer and the polymerization initiator are consumed. The holding step may be 4 hours, for example. During the holding step, a plurality of piece of sampling are performed every hour, for example. In the example illustrated in FIG. 4, a total of five pieces of sampling are performed every hour during the period from time t14 to time t18. By the pieces of sampling during this holding step, the viscosity of the resin composition can be measured, for example.

After the holding step, from time t18 to time t19, a diluting-and-cooling step is performed to reduce the temperature in the reaction vessel. By sampling after this diluting-and-cooling step, the NV value of the resin composition can be measured, for example.

When using the prediction model PM learned based on the spectral data SD acquired by the offline measurement, it is suitable to perform prediction based on the spectral data SD acquired by the offline measurement. When using the prediction model PM learned based on the spectral data SD acquired by the online measurement, it is suitable to perform prediction based on the spectral data SD acquired by the online measurement.

Even with the prediction model PM learned based on the spectral data SD acquired by the offline measurement, it is possible to perform prediction based on the spectral data SD acquired by the online measurement by performing temperature correction. Even with the prediction model PM learned based on the spectral data SD acquired by the online measurement, it is possible to perform prediction based on the spectral data SD acquired by the offline measurement by performing temperature correction.

The method for measuring the spectral data SD is not limited to the examples of the offline measurement and the online measurement described above and may be measured by other methods.

Learning Stage

Figure 5:
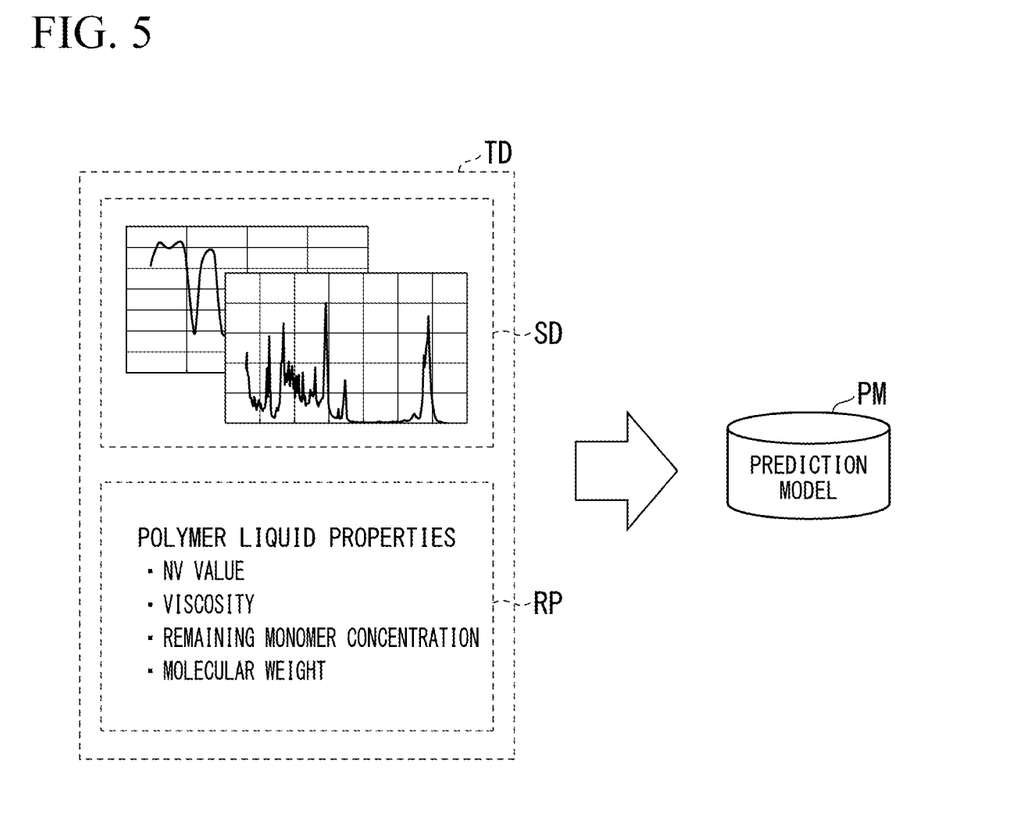
FIG. 5 is a functional configuration diagram for illustrating an example of a learning stage according to the present embodiment.
Figure 6:
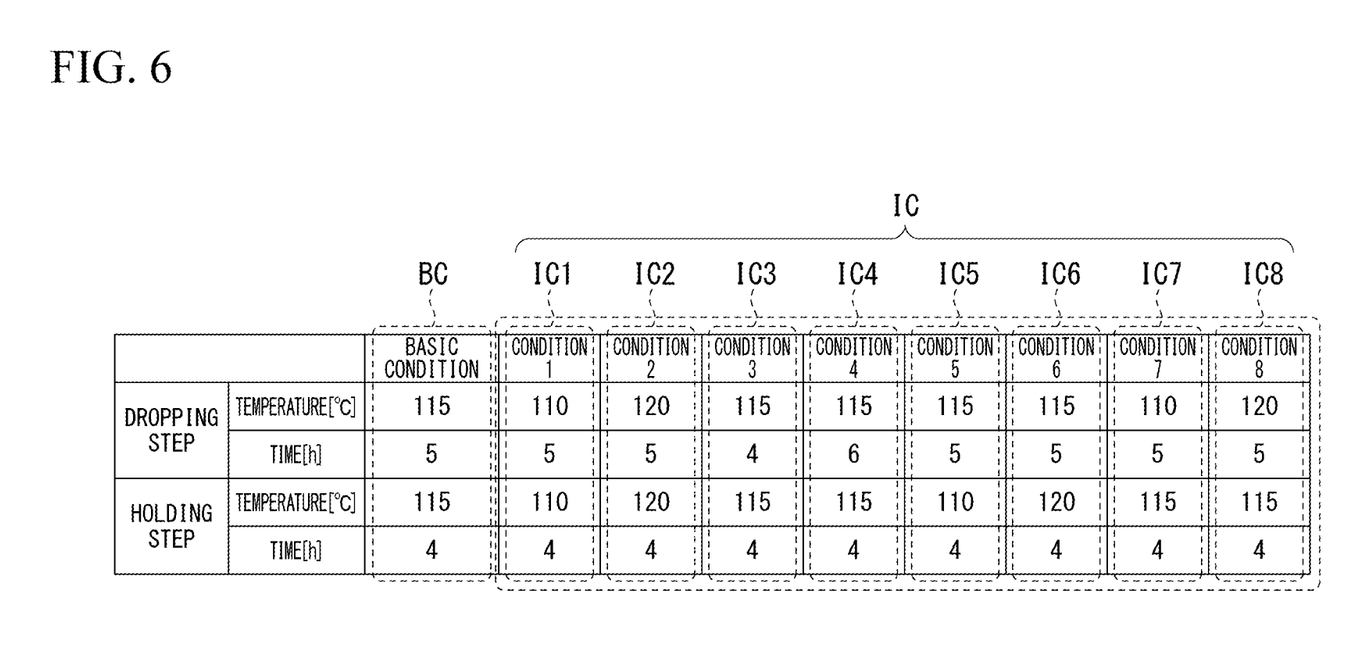
FIG. 6 is a diagram for illustrating an example of polymerization conditions for creating training data according to the present embodiment.

The following describes an example of the learning stage with reference to FIG. 5 and FIG. 6.

FIG. 5 is a functional configuration diagram for illustrating an example of the learning stage according to the present embodiment. The following describes learning of the prediction model PM with reference to the drawing. In the following description, the prediction model PM may be described as a learning apparatus, a learned model 122, or the like.

The prediction model PM is learned by supervised learning using training data TD. The training data TD associates the spectral data SD measured in advance by the online measurement or the offline measurement and the resin property value RP with each other. The prediction model PM predicts the resin property value RP corresponding to the spectral data SD. That is, the prediction model PM is learned to predict the resin property value RP corresponding to the spectral data SD with the spectral data SD obtained by measuring the resin composition sampled in the process of performing a resin polymerization reaction in a batch type reaction tank by a spectroscopic sensor and the resin property value RP of the resin composition as the training data TD.

Here, the prediction model PM may try methods of regression such as Ridge regression, Lasso regression, random forests, support vector regression, and partial least squares regression (PLS) and select the most appropriate method. That is, the prediction model PM first performs first learning based on the same training data TD by a plurality of machine learning algorithms. Next, the prediction model PM selects any one of a plurality of results with the first learning performed. By thus trying learning by the machine learning algorithms, the optimal method of regression can be selected.

The prediction model PM is learned using a plurality of pieces of training data TD. The pieces of training data TD may be pieces of data measured with conditions varied.

The pieces of training data TD for use in learning are suitably identical or substantially regarded as identical in temperature. Being substantially regarded as identical may be substantially not affecting the resin property value RP, for example.

FIG. 6 is a diagram for illustrating an example of polymerization conditions for creating training data according to the present embodiment. The following describes an example of the polymerization conditions for creating the pieces of training data TD with reference to the drawing.

Here, to cause the prediction model PM to learn, a plurality of pieces of (if possible, many pieces of) training data TD are desirably created. When the pieces of training data TD are created using the same polymerization condition, errors may occur in the prediction stage due to overfitting. Thus, in the present embodiment, to prevent overfitting, the pieces of training data TD are created using a basic condition BC, and furthermore, the pieces of training data TD are created by a plurality of improved conditions IC with conditions varied centered on the basic condition BC.

The example illustrated in FIG. 6 illustrates an example when, as the basic condition BC, the temperature of the dropping step is "115 [° C.]" and "5 [h]", whereas the temperature of the holding step is "115 [° C.]" and "4 [h]". To create the training data TD, data of six lots, for example, are acquired on the basic condition BC. In the measurement described with reference to FIG. 4, six pieces of data can be acquired for one lot, and thus a total of 36 pieces of data can be obtained by acquiring the data of 6 lots. In the basic condition, the liquid temperature may vary by ±1 [° C.] and the dropping time may vary by ±10 [minutes] lot by lot.

FIG. 6 also illustrates, as the improved conditions IC, conditions with the time and the temperature of the dropping step and the holding step of the basic condition BC varied.

Specifically, as the improved conditions IC, eight conditions of an improved condition IC1 to an improved condition IC8 are illustrated.

In the improved condition IC1, the temperature of the dropping step is "110 [° C.]" and "5 [h]", whereas the temperature of the holding step is "110 [° C.]" and "4 [h]". In the improved condition IC2, the temperature of the dropping step is "120 [° C.]" and "5 [h]", whereas the temperature of the holding step is "120 [° C.]" and "4 [h]". In the improved condition IC3, the temperature of the dropping step is "115 [° C.]" and "4 [h]", whereas the temperature of the holding step is "115 [° C.]" and "4 [h]". In the improved condition IC4, the temperature of the dropping step is "115 [° C.]" and "6 [h]", whereas the temperature of the holding step is "115 [° C.]" and "4 [h]". In the improved condition IC5, the temperature of the dropping step is "115 [° C.]" and "5 [h]", whereas the temperature of the holding step is "110 [° C.]" and "4 [h]". In the improved condition IC6, the temperature of the dropping step is "115 [° C.]" and "5 [h]", whereas the temperature of the holding step is "120 [° C.]" and "4 [h]". In the improved condition IC7, the temperature of the dropping step is "110 [° C.]" and "5 [h]", whereas the temperature of the holding step is "115 [° C.]" and "4 [h]". In the improved condition IC8, the temperature of the dropping step is "120 [° C.]" and "5 [h]", whereas the temperature of the holding step is "115 [° C.]" and "4 [h]".

The prediction model PM is learned with data acquired on a total of conditions of 14 lots using the basic condition BC of six lots and the improved condition IC of eight lots as described above (that is, 84 pieces of data) as training data TD, for example.

Prediction Stage

The following describes an example of the prediction stage with reference FIG. 7 to FIG. 9D.

Figure 7:
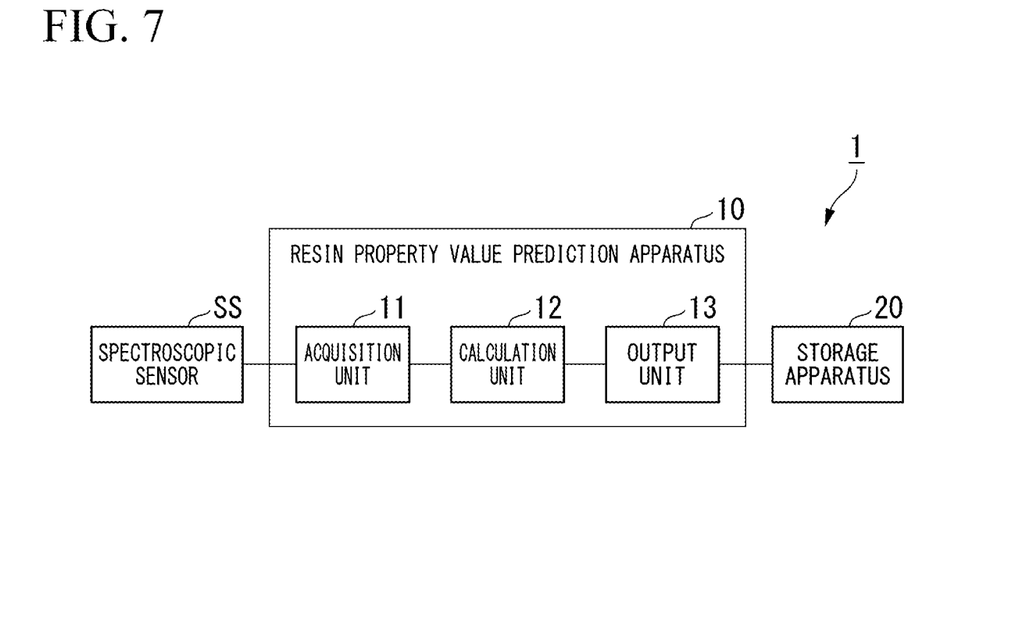
FIG. 7 is a functional configuration diagram of an example of the functional configuration of a resin property value prediction apparatus in a prediction stage according to the present embodiment.

FIG. 7 is a functional configuration diagram of an example of the functional configuration of a resin property value prediction apparatus in the prediction stage according to the present embodiment. The following describes an example of the resin property value prediction system 1 in the prediction stage with reference to the drawing. The resin property value prediction system 1 includes a spectroscopic sensor SS, a resin property value prediction apparatus 10, and a storage apparatus 20. The resin property value prediction apparatus 10 includes an acquisition unit 11, a calculation unit 12, and an output unit 13.

The spectroscopic sensor SS measures the resin composition sampled in the process of performing the resin polymerization reaction in the batch type reaction tank. The acquisition unit 11 acquires the spectral data SD obtained by measurement by the spectroscopic sensor SS. The spectroscopic sensor SS measuring the spectral data SD to be acquired by the acquisition unit 11 may be at least either the near-infrared (NIR) spectroscopic sensor or the Raman spectroscopic sensor.

An example of the resin composition according to the present embodiment is specifically an acrylic resin and may be more specifically in the form of a solution containing an acrylic resin. That is, the acquisition unit 11 acquires the spectral data obtained by measuring specifically the resin product that is the acrylic resin or more specifically the resin product in the form of the solution containing the acrylic resin by the spectroscopic sensor SS.

When the resin property value prediction apparatus 10 is used for the offline measurement, the acquisition unit 11 acquires the spectral data SD measured after the sampled resin composition is allowed to cool for a certain time.

When the resin property value prediction apparatus 10 is used for the online measurement, the acquisition unit 11 acquires the spectral data SD measured at every certain time while the resin polymerization reaction is being performed in the batch type reaction tank.

The calculation unit 12 calculates the resin property value RP of the resin composition having the spectral data SD acquired by the acquisition unit 11 using the prediction model PM. The prediction model PM is a learned model having been learned in advance with the spectral data SD obtained by measuring the resin composition and the resin property value RP as training data. That is, the calculation unit 12 calculates the resin property value RP by machine learning.

The output unit 13 outputs information on the resin property value RP calculated by the calculation unit 12 to the storage apparatus 20. The information on the resin property value RP stored in the storage apparatus 20 may be transmitted to an information processing terminal, not shown, via a certain communication network or displayed on a display unit, not shown.

Figure 8:
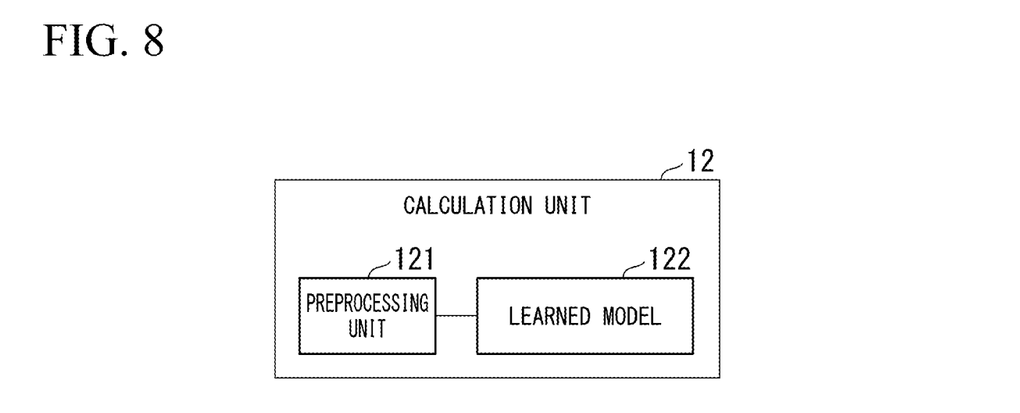
FIG. 8 is a functional configuration diagram of an example of the functional configuration of a calculation unit according to the present embodiment.

FIG. 8 is a functional configuration diagram of an example of the functional configuration of the calculation unit according to the present embodiment. The following describes an example of the functional configuration of the calculation unit 12 with reference to the drawing. The calculation unit 12 includes a preprocessing unit 121 and the learned model 122. The learned model 122 is an example of the prediction model PM.

The preprocessing unit 121 performs preprocessing on the spectral data SD acquired by the spectroscopic sensor SS.

The information contained in the spectral data SD may contain information directly used for the calculation of the resin property value RP and unnecessary information (noise) that will be errors in the calculation of the resin property value RP. The preprocessing unit 121 performs the preprocessing on the spectral data SD to remove the unnecessary information and to extract only the main information.

When the preprocessing is performed by the preprocessing unit 121, the learned model 122 is learned based on the information obtained by performing the preprocessing on the spectral data SD in the learning stage like in the prediction stage.

Examples of the preprocessing performed by the preprocessing unit 121 include smoothing processing. In other words, the preprocessing unit 121 performs the smoothing processing on the spectral data SD acquired by the acquisition unit 11 to perform the preprocessing on the spectral data SD. Specifically, the preprocessing unit 121 may perform the smoothing processing by approximating to a polynomial. Suitably, the preprocessing unit 121 may perform the smoothing processing by local regression. In this case, by varying a window length (kernel width), necessary information may be omitted or noise may not be completely removed. Thus, the preprocessing unit 121 may perform regression on the spectral data SD by selecting the optimal window length.

When the smoothing processing is performed by the preprocessing unit 121, the calculation unit 12 calculates the resin property value RP based on the spectral data SD with the smoothing processing performed by the preprocessing unit 121. When the smoothing processing is performed by the preprocessing unit 121, the learned model 122 is learned based on information obtained by performing the smoothing processing on the spectral data SD in the learning stage. In other words, the spectral data SD included in the training data TD may be the spectral data SD obtained by performing the smoothing processing on the spectral data SD measured by the spectroscopic sensor SS in advance.

Figure 9A:
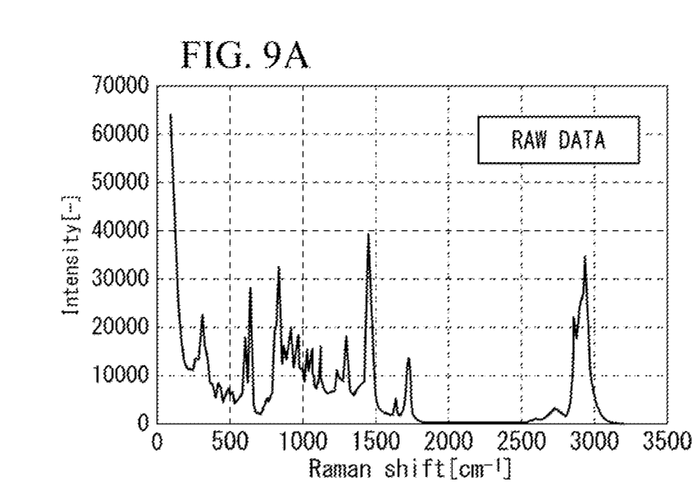
FIG. 9A to FIG. 9D are diagrams for illustrating an example of smoothing processing according to the present embodiment.
Figure 9B:
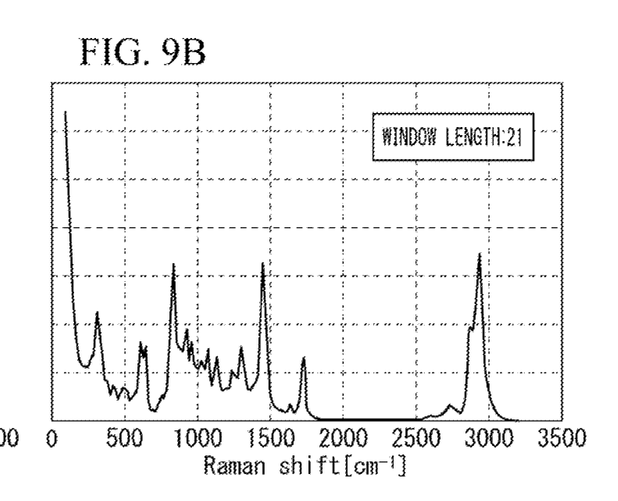
Figure 9C:
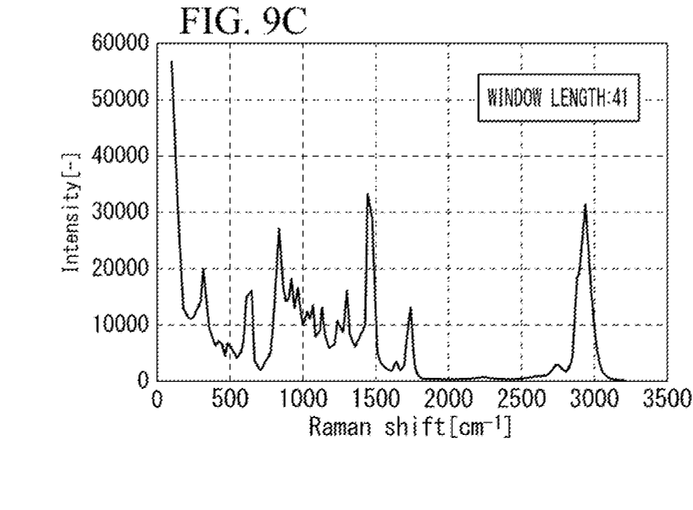
Figure 9D:
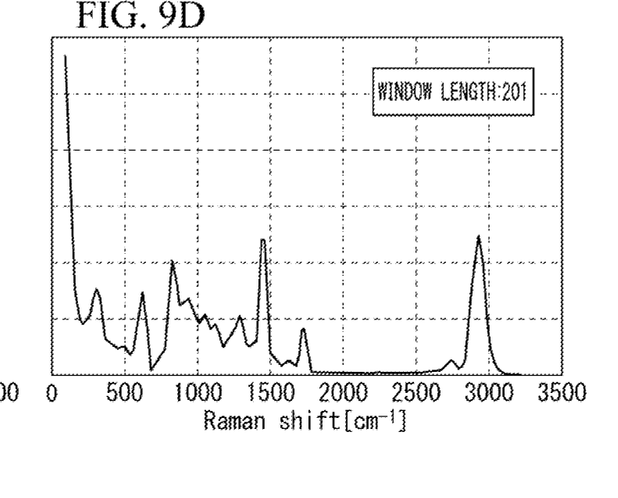

FIG. 9A to FIG. 9D are diagrams for illustrating an example of the smoothing processing according to the present embodiment. The following describes an example of the smoothing processing performed by the preprocessing unit 121 with reference to the drawing. FIG. 9A illustrates the spectral data SD before performing the smoothing processing, whereas FIG. 9B to FIG. 9D illustrate results after performing the smoothing processing for the spectral data SD illustrated in FIG. 9A with the window length each varied.

The smoothing processing has not been performed on the spectral data SD illustrated in FIG. 9A. Thus, the spectral data SD illustrated in FIG. 9A contains a lot of noise.

FIG. 9B is an example of the smoothing processing performed by local regression with a window length of 21. As illustrated in the drawing, performing the local regression with a window length of 21 results in the removal of the noise illustrated in FIG. 9A.

FIG. 9C is an example of the smoothing processing performed by local regression with a window length of 41. As illustrated in the drawing, performing the local regression with a window length of 41 results in the removal of the noise illustrated in FIG. 9A, but there are areas in which even main information has been omitted. For example, referring to FIG. 9A and FIG. 9B, it can be seen that there are two peaks between 500 and 700 [$cm^{-1}$]. However, referring to FIG. 9C, it can be seen that one peak has been omitted.

FIG. 9D is an example of the smoothing processing performed by local regression with a window length of 201. As illustrated in the drawing, performing the local regression with a window length of 201 results in the removal of the noise illustrated in FIG. 9A, but main information (peaks) has been quite omitted.

When performing the smoothing processing, the preprocessing unit 121 can reduce noise, but when there are minimal peaks, they may disappear. Thus, in selecting the window length, it is desirable to select a value moderate enough to be able to reduce noise and not to cause important and minimal peaks to disappear.

Specifically, it is suitable for the preprocessing unit 121 to perform the smoothing processing by the local regression with a window length of less than 41. More suitably, the preprocessing unit 121 performs the smoothing processing by the local regression with a window length of about 21.

In addition to or in place of performing the smoothing processing on the spectral data SD acquired by the acquisition unit 11, the preprocessing unit 121 may perform differentiating processing. When the preprocessing unit 121 performs the differentiating processing, the calculation unit 12 calculates the resin property value RP based on the spectral data SD with the differentiating processing performed by the preprocessing unit 121.

By performing the differentiating processing, the preprocessing unit 121 can extract the respective pieces of spectral information from overlapping peaks and can correct a baseline.

When the preprocessing unit 121 performs the differentiating processing, the spectral data SD included in the training data TD is the spectral data SD obtained by performing the differentiating processing on the spectral data SD measured by the spectroscopic sensor SS in advance.

On the other hand, the preprocessing unit 121 may increase noise in a spectrum by performing the differentiating processing. Thus, depending on the spectral data SD, it is better to perform the differentiating processing or it is better not to perform the differentiating processing. Thus, the preprocessing unit 121 may perform the smoothing processing on the spectral data SD, further perform the differentiating processing independently therefrom, and execute machine learning using the optimal spectral data SD.

That is, the preprocessing unit 121 may perform the smoothing processing on the spectral data SD acquired by the acquisition unit 11 and the differentiating processing on the spectral data SD acquired by the acquisition unit 11 independently from each other, and the calculation unit 12 may calculate the resin property value RP based on either the spectral data SD with the smoothing processing performed by the preprocessing unit 121 or the spectral data SD with the differentiating processing performed by the preprocessing unit 121.

The preprocessing unit 121 may perform the differentiating processing on the spectral data SD with the smoothing processing performed.

The Savitzky-Golay method (hereinafter referred to as the SG method), which is based on the least-squares method, is known as a representative method for the smoothing processing and the differentiating processing such as those described above. The preprocessing unit 121 may perform the preprocessing by the SG method.

In addition to performing the smoothing processing and/or the differentiating processing on the spectral data SD acquired by the acquisition unit 11, the calculation unit 12 may also perform logarithmic transformation processing on the resin property value RP. For example, when the relation between the spectral data SD and the resin property value RP follows an Arrhenius-type physical law, it is effective to perform the logarithmic transformation processing on the resin property value RP. On the other hand, performing the logarithmic transformation processing on the resin property value RP may increase the prediction error of the resin property value RP. That is, performing the logarithmic transformation processing on the resin property value RP may or may not improve accuracy.

Thus, the calculation unit 12 may output either the resin property value RP with the logarithmic transformation processing performed or the resin property value RP without the logarithmic transformation processing performed as the resin property value RP. The logarithmic transformation processing on the resin property value is performed independently from the smoothing processing and the differentiating processing.

If the spectral data SD does not contain any noise, the resin property value prediction system 1 may employ a configuration without the preprocessing unit 121.

[Prediction Result]

Figure 10A:
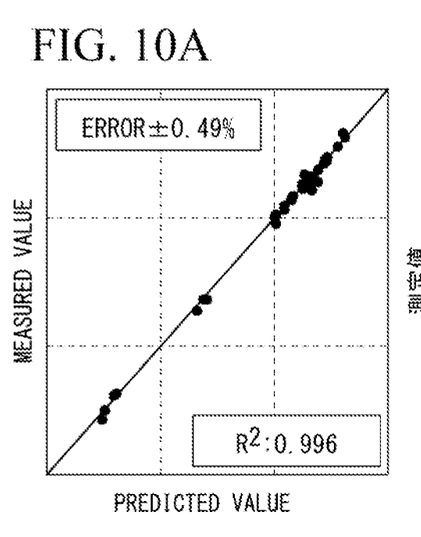
FIG. 10A and FIG. 10B are diagrams schematically illustrating specific examples of a prediction result of the resin property value prediction apparatus according to the present embodiment.

The following next describes examples of a prediction result by the resin property value prediction system 1 with reference to FIG. 10A to FIG. 14. FIG. 10A and FIG. 10B are diagrams schematically illustrating specific examples of the prediction result of the resin property value prediction apparatus according to the present embodiment. The prediction result is obtained by calculating an error and a determination coefficient $R^2$ with actually measured values taken on the horizontal axis and predicted values by the resin property value prediction apparatus 10 taken on the vertical axis. FIG. 11 to FIG. 14 illustrate the results of the combination of cases in which as the sensor type the NIR sensor is used and the Raman sensor is used and cases in which the prediction model PM is learned using only the basic condition BC as the training data TD and the prediction model PM is learned using the improved condition IC in addition to the basic condition BC.

Figure 10B:
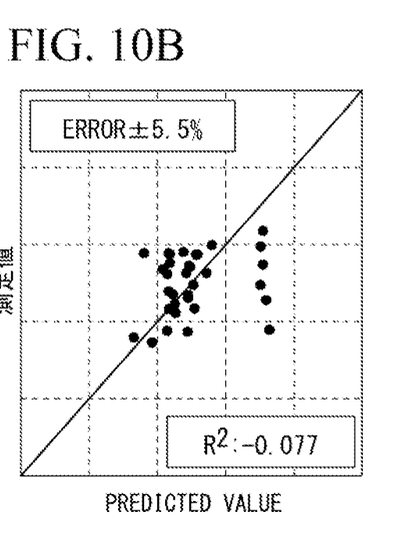

The following first describes specific examples of the prediction result of the resin property value prediction apparatus with reference to FIG. 10A and FIG. 10B. FIG. 10A is an example when the error and the determination coefficient $R^2$ are good, whereas FIG. 10B is an example when the error and the determination coefficient $R^2$ are bad. The graphs illustrated in FIG. 10A and FIG. 10B take the predicted values on the horizontal axis and take the measured values on the vertical axis, and thus the points of the measurement results closer to the straight line illustrated in the drawing indicate better accuracy. In the example illustrated in FIG. 10A, specifically, the error is ±0.49 [%], whereas the determination coefficient $R^2$ is 0.996. Similarly, the points of the measurement results farther from the straight line illustrated in the drawing indicate worse accuracy. In the example illustrated in FIG. 10B, specifically, the error is ±5.5 [%], whereas the determination coefficient $R^2$ is −0.077.

Figure 11:
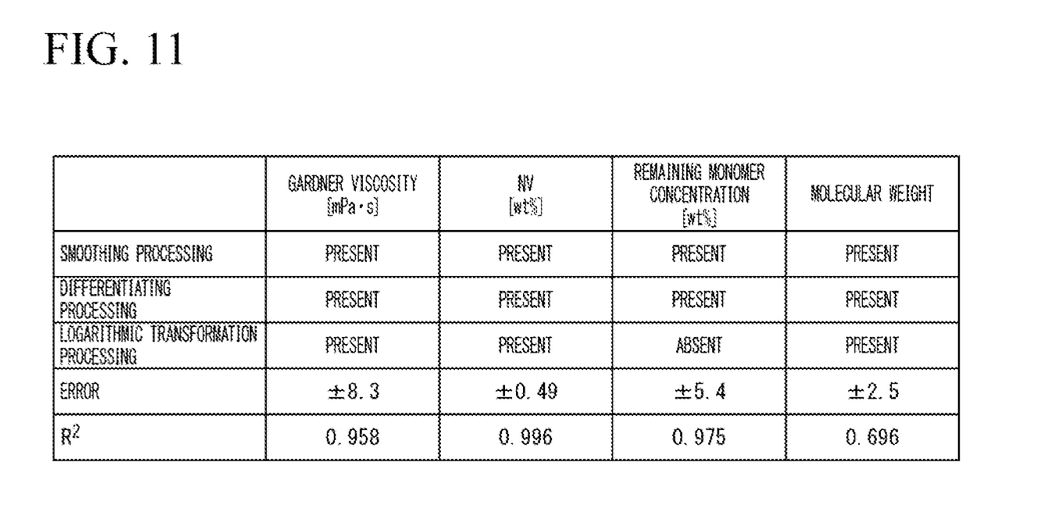
FIG. 11 is a diagram for illustrating a first example of the prediction result of the resin property value prediction apparatus according to the present embodiment.
Figure 12:
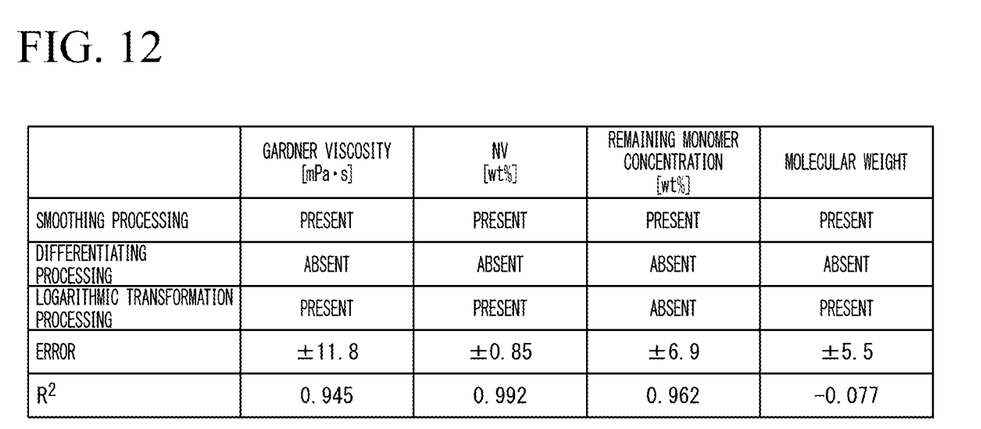
FIG. 12 is a diagram for illustrating a second example of the prediction result of the resin property value prediction apparatus according to the present embodiment.
Figure 13:
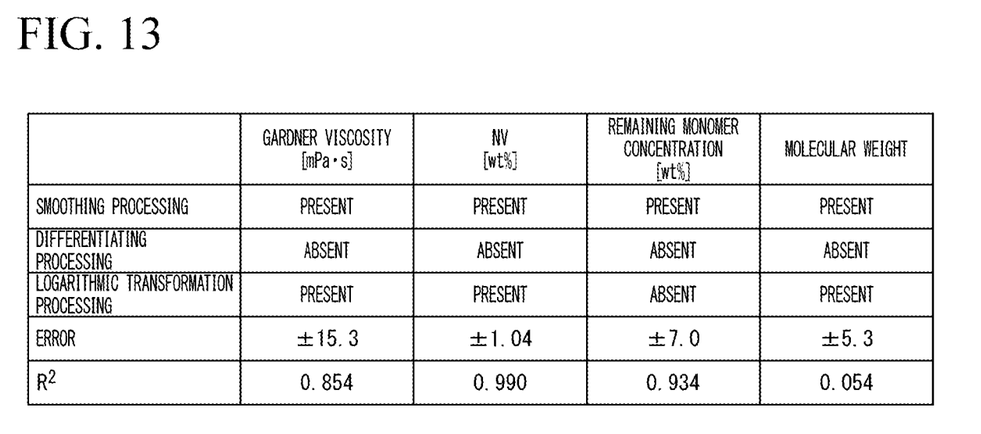
FIG. 13 is a diagram for illustrating a third example of the prediction result of the resin property value prediction apparatus according to the present embodiment.
Figure 14:
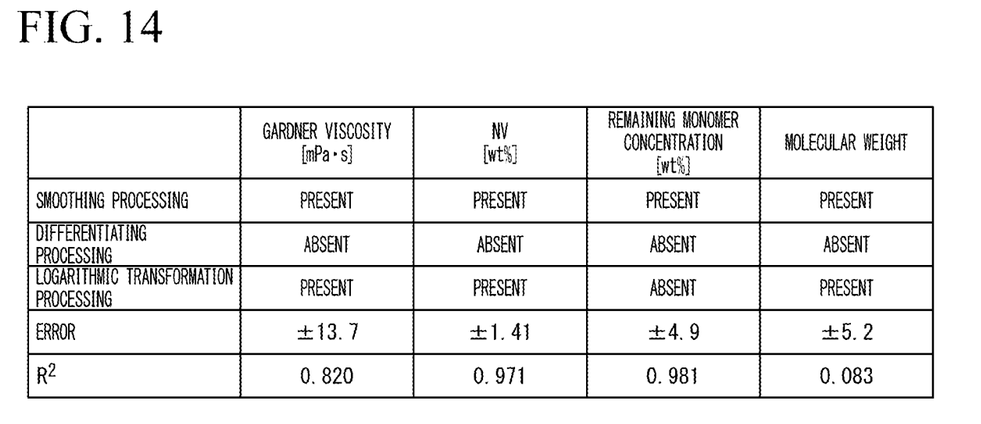
FIG. 14 is a diagram for illustrating a fourth example of the prediction result of the resin property value prediction apparatus according to the present embodiment.

FIG. 11 to FIG. 14 are diagrams for illustrating respective examples of the prediction result of the resin property value prediction apparatus according to the present embodiment. The example illustrated in FIG. 11 is an example when the NIR sensor is used and the prediction model PM is learned using only the basic condition BC. The example illustrated in FIG. 12 is an example when the Raman sensor is used and the prediction model PM is learned using only the basic condition BC. The example illustrated in FIG. 13 is an example when the NIR sensor is used and the prediction model PM is learned using the basic condition BC and the improved condition IC. The example illustrated in FIG. 14 is an example when the Raman sensor is used and the prediction model PM is learned using the basic condition BC and the improved condition IC.

FIG. 11 to FIG. 14 each illustrate the results of predicting a Gardner viscosity [mPa·s] as an example of the resin property value RP, an NV value [wt %] as an example of the resin property value RP, a remaining monomer concentration, and a molecular weight. Each result indicates whether the smoothing processing, the differentiating processing, and the logarithmic transformation processing have been performed by "present" or "absent."

The following first describes the example when the NIR sensor is used and the prediction model PM is learned using only the basic condition BC with reference to FIG. 11.

The Gardner viscosity [mPa·s] was learned and predicted with all the smoothing processing, the differentiating processing, and the logarithmic transformation processing performed. In this case, the determination coefficient $R^2$ was 0.958, whereas the error was ±8.3 [%].

The NV value [wt %] was learned and predicted with all the smoothing processing, the differentiating processing, and the logarithmic transformation processing performed. In this case, the determination coefficient $R^2$ was 0.996, whereas the error was ±0.49 [%].

The remaining monomer concentration was learned and predicted with the smoothing processing and the differentiating processing performed and without the logarithmic transformation processing performed. In this case, the determination coefficient $R^2$ was 0.975, whereas the error was ±5.4 [%].

The molecular weight was learned and predicted with all the smoothing processing, the differentiating processing, and the logarithmic transformation processing performed. In this case, the determination coefficient $R^2$ was 0.696, whereas the error was ±2.5 [%].

The following next describes the example when the Raman sensor is used and the prediction model PM is learned using only the basic condition BC with reference to FIG. 12.

The Gardner viscosity [mPa·s] was learned and predicted with the smoothing processing and the logarithmic transformation processing performed and without the differentiating processing performed. In this case, the determination coefficient $R^2$ was 0.945, whereas the error was ±11.8 [%].

The NV value [wt %] was learned and predicted with the smoothing processing and the logarithmic transformation processing performed and without the differentiating processing performed. In this case, the determination coefficient $R^2$ was 0.992, whereas the error was ±0.85 [%].

The remaining monomer concentration was learned and predicted with the smoothing processing performed and without the differentiating processing and the logarithmic transformation processing performed. In this case, the determination coefficient $R^2$ was 0.962, whereas the error was ±6.9 [%].

The molecular weight was learned and predicted with the smoothing processing and the logarithmic transformation processing performed and without the differentiating processing performed. In this case, the determination coefficient $R^2$ was −0.077, whereas the error was ±5.5 [%].

The following next describes the example when the NIR sensor is used and the prediction model PM is learned using the basic condition BC and the improved condition IC with reference to FIG. 13.

The Gardner viscosity [mPa·s] was learned and predicted with all the smoothing processing, the differentiating processing, and the logarithmic transformation processing performed. In this case, the determination coefficient $R^2$ was 0.854, whereas the error was ±15.3 [%].

The NV value [wt %] was learned and predicted with all the smoothing processing, the differentiating processing, and the logarithmic transformation processing performed. In this case, the determination coefficient $R^2$ was 0.990, whereas the error was ±1.04 [%].

The remaining monomer concentration was learned and predicted with all the smoothing processing, the differentiating processing, and the logarithmic transformation processing performed.

In this case, the determination coefficient $R^2$ was 0.934, whereas the error was ±7.0 [%].

The molecular weight was learned and predicted with all the smoothing processing, the differentiating processing, and the logarithmic transformation processing performed. In this case, the determination coefficient $R^2$ was 0.054, whereas the error was ±5.3 [%].

The following next describes the example when the Raman sensor is used and the prediction model PM is learned using the basic condition BC and the improved condition IC with reference to FIG. 14.

The Gardner viscosity [mPa·s] was learned and predicted with the smoothing processing and the logarithmic transformation processing performed and without the differentiating processing performed. In this case, the determination coefficient $R^2$ was 0.820, whereas the error was ±13.7 [%].

The NV value [wt %] was learned and predicted with the smoothing processing and the logarithmic transformation processing performed and without the differentiating processing performed. In this case, the determination coefficient $R^2$ was 0.971, whereas the error was ±1.41 [%].

The remaining monomer concentration was learned and predicted with the smoothing processing performed and without the differentiating processing and the logarithmic transformation processing performed. In this case, the determination coefficient $R^2$ was 0.981, whereas the error was ±4.9 [%].

The molecular weight was learned and predicted with the smoothing processing and the logarithmic transformation processing performed and without the differentiating processing performed. In this case, the determination coefficient $R^2$ was 0.083, whereas the error was ±5.2 [%].

Summary of Embodiment

According to the embodiment described above, the resin property value prediction apparatus 10 includes the acquisition unit 11 to acquire the spectral data SD obtained by measuring the resin composition by the spectroscopic sensor SS in the process of performing the resin polymerization reaction in the batch type reaction tank and includes the calculation unit 12 to calculate the resin property value RP of the resin composition using the prediction model PM. That is, the resin property value prediction apparatus 10 does not require to perform property inspection work for each sample and can thus calculate the properties of the resin composition in a short time. In addition, the resin property value prediction apparatus 10 does not require work for measuring the resin property value RP by an operator and can thus reduce variations in measurement accuracy.

According to the embodiment described above, in the learning stage of the prediction model PM, the spectral data SD included in the training data TD is the spectral data SD obtained by performing the smoothing processing on the spectral data SD measured by the spectroscopic sensor SS in advance. The calculation unit 12 included in the resin property value prediction apparatus 10 includes the preprocessing unit 121 to perform the smoothing processing on the spectral data SD acquired by the acquisition unit 11 and calculates the resin property value RP based on the spectral data SD with the smoothing processing performed by the preprocessing unit 121. The preprocessing unit 121 removes the noise contained in the spectral data SD in advance by performing the smoothing processing. Consequently, according to the present embodiment, the noise contained in the spectral data SD can be removed by the smoothing processing, and thus the properties of the resin composition can be calculated with high accuracy.

According to the embodiment described above, in the learning stage of the prediction model PM, the spectral data SD included in the training data TD is the spectral data SD obtained by performing the differentiating processing on the spectral data SD measured by the spectroscopic sensor SS in advance. The calculation unit 12 included in the resin property value prediction apparatus 10 includes the preprocessing unit 121 to further perform the differentiating processing on the spectral data SD acquired by the acquisition unit 11 and calculates the resin property value RP based on the spectral data SD with the differentiating processing performed by the preprocessing unit 121. The preprocessing unit 121 performs the differentiating processing to extract the spectral information from overlapping peaks or the like contained in the spectral data SD and to perform baseline correction. Consequently, according to the present embodiment, the spectral information can be extracted from the overlapping peaks or the like contained in the spectral data SD by the differentiating processing, and the baseline correction can be performed, and thus the properties of the resin composition can be calculated with high accuracy.

According to the embodiment described above, the preprocessing unit 121 performs the smoothing processing and the differentiating processing on the spectral data SD acquired by the acquisition unit 11 independently from each other and calculates the resin property value RP based on either the spectral data SD with the smoothing processing performed by the preprocessing unit 121 or the spectral data SD with the differentiating processing performed by the preprocessing unit 121. In other words, there are cases in which the optimum result is obtained by performing the smoothing processing and cases in which the optimum result is obtained by performing the differentiating processing, and thus the calculation unit 12 performs the smoothing processing and the differentiating processing independently from each other and then calculates the resin property value RP using either of them. Consequently, according to the present embodiment, the resin property value RP can be calculated with high accuracy.

According to the embodiment described above, the preprocessing unit 121 performs the smoothing processing by the local regression with a window length of less than 41. Consequently, the resin property value prediction apparatus 10 can perform the smoothing processing within a range in which important and minimal peaks are less likely to disappear while removing the noise contained in the spectral data SD.

According to the embodiment described above, the acquisition unit 11 acquires the spectral data SD measured after the sampled resin composition is allowed to cool for a certain time. That is, the resin property value prediction apparatus 10 executes machine learning based on offline measured results. Consequently, according to the present embodiment, the resin property value RP can be calculated based on the offline measured results. The resin property value prediction apparatus 10 can calculate the resin property value RP based on the offline measured results and can thus end processing in a shorter time than before in property evaluation and endpoint management. The resin property value prediction apparatus 10 can calculate the resin property value RP based on the offline measured results, and thus the measurement accuracy does not depend on an operator.

According to the embodiment described above, the acquisition unit 11 acquires the spectral data SD measured at every certain time while the resin polymerization reaction is being performed in the batch type reaction tank. That is, the resin property value prediction apparatus 10 executes machine learning based on online measured results. Consequently, according to the present embodiment, the resin property value RP can be calculated based on the online measured results. The resin property value prediction apparatus 10 can calculate the resin property value RP based on the online measured results and can thus end processing in a shorter time than before in property evaluation and endpoint management. The resin property value prediction apparatus 10 can calculate the resin property value RP based on the online measured results, and thus the measurement accuracy does not depend on an operator. In addition, in the online measurement, sampling is not performed while the resin polymerization reaction is being performed in the batch type reaction tank, and thus sampling work can be reduced.

According to the embodiment described above, the acquisition unit 11 acquires the spectral data SD obtained by measuring the resin product that is the acrylic resin by the spectroscopic sensor SS. Consequently, according to the present embodiment, the resin property value prediction apparatus 10 can calculate the resin property value RP of the acrylic resin.

The acquisition unit 11 can acquire the spectral data SD obtained by measuring the resin product in the form of the solution containing the acrylic resin by the spectroscopic sensor SS. Consequently, the resin property value prediction apparatus 10 can calculate the resin property value RP of the resin product in the form of the solution containing the acrylic resin.

According to the embodiment described above, the spectroscopic sensor SS measuring the spectral data SD to be acquired by the acquisition unit 11 is at least either the near-infrared (NIR) spectroscopic sensor or the Raman spectroscopic sensor. Consequently, according to the present embodiment, the resin property value RP can be calculated based on the spectral data SD measured by the near-infrared spectroscopic sensor or the Raman spectroscopic sensor.

According to the embodiment described above, the prediction model PM is learned to predict the resin property value RP corresponding to the spectral data SD with the spectral data SD obtained by measuring the resin composition by the spectroscopic sensor SS in the process of performing the resin polymerization reaction in the batch type reaction tank and the resin property value of the resin composition as the training data TD. Consequently, the resin property value prediction apparatus 10 includes the prediction model PM and can thereby calculate the resin property value RP based on the spectral data SD.

The entire functions of the units included in the resin property value prediction system 1 in the embodiment described above or partial functions thereof may be implemented by recording a computer program for implementing these functions on a computer-readable recording medium and causing a computer system to read and execute the computer program recorded on this recording medium. The term "computer system" herein shall include an operating system (OS) and hardware such as peripherals.

The term "computer-readable recording medium" refers to a portable medium such as a magneto-optical disc, a read only memory (ROM), or a compact disc read only memory (CD-ROM) or a storage unit such as a hard disk incorporated into the computer system. Furthermore, the term "computer readable recording medium" may also include one dynamically holding the computer program for a short time, such as a communication line in the case of transmitting the computer program via a network such as the Internet, or one holding the computer program for a certain time, such as a volatile memory inside the computer system serving as a server or a client in the former case. The computer program may be for implementing part of the functions described above and furthermore can implement the functions described above in combination with a computer program already recorded in the computer system.

The components and the combinations thereof in each embodiment are by way of example, and addition, omission, replacement, and other changes of the components are possible to the extent that they do not depart from the gist of the present invention. The present invention is not limited by each embodiment but is limited only by the scope of what is claimed.

What is claimed is:

1. A resin property value prediction apparatus comprising:
an acquisition unit acquiring spectral data obtained by measuring a resin composition by a spectroscopic sensor in a process of performing a resin polymerization reaction in a batch type reaction tank; and
a calculation unit, using a learned model learned with spectral data obtained by measuring the resin composition in advance and a resin property value as training data, calculating the resin property value of the resin composition having the spectral data acquired by the acquisition unit,
wherein the spectral data included in the training data is spectral data obtained by performing smoothing processing on spectral data measured by the spectroscopic sensor in advance, and
wherein the calculation unit further includes a preprocessing unit performing smoothing processing on the spectral data acquired by the acquisition unit and calculates the resin property value based on the spectral data with the smoothing processing performed by the preprocessing unit.

2. The resin property value prediction apparatus according to claim 1, wherein
the spectral data included in the training data is spectral data obtained by performing differentiating processing on spectral data measured by the spectroscopic sensor in advance,
the preprocessing unit further performs differentiating processing on the spectral data acquired by the acquisition unit, and
the calculation unit calculates the resin property value based on the spectral data with the differentiating processing performed by the preprocessing unit.

3. The resin property value prediction apparatus according to claim 2, wherein
the preprocessing unit performs the smoothing processing on the spectral data acquired by the acquisition unit and the differentiating processing on the spectral data acquired by the acquisition unit independently from each other, and
the calculation unit calculates the resin property value based on any of the spectral data with the smoothing processing performed by the preprocessing unit, the spectral data with the differentiating processing performed by the preprocessing unit, and spectral data with neither the smoothing processing nor the differentiating processing performed by the preprocessing unit.

4. The resin property value prediction apparatus according to claim 3, wherein the calculation unit performs logarithmic transformation processing on the resin property value independently from the smoothing processing and the differentiating processing and outputs either the resin property value with the logarithmic transformation processing performed or the resin property value without the logarithmic transformation processing performed.

5. The resin property value prediction apparatus according to claim 2, wherein the preprocessing unit performs the smoothing processing by local regression with a window length of less than 41.

6. The resin property value prediction apparatus according to claim 1, wherein the acquisition unit acquires spectral data measured after a sampled resin composition is allowed to cool for a certain time.

7. The resin property value prediction apparatus according to claim 1, wherein the acquisition unit acquires spectral data measured at every certain time while the resin polymerization reaction is being performed in the batch type reaction tank.

8. The resin property value prediction apparatus according to claim 1, wherein
the resin composition is an acrylic resin, and
the acquisition unit acquires spectral data obtained by measuring the acrylic resin by the spectroscopic sensor.

9. The resin property value prediction apparatus according to claim 1, wherein the spectroscopic sensor measuring the spectral data acquired by the acquisition unit is at least either a near-infrared (NIR) spectroscopic sensor or a Raman spectroscopic sensor.

10. A method for predicting a resin property value, the method comprising:

acquiring spectral data obtained by measuring a resin composition by a spectroscopic sensor in a process of performing a resin polymerization reaction in a batch type reaction tank; and using a learned model learned with spectral data obtained by measuring the resin composition in advance and a resin property value as training data, calculating the resin property value of the resin composition having the spectral data acquired at the acquiring, wherein the spectral data included in the training data is spectral data obtained by performing smoothing processing on spectral data measured by the spectroscopic sensor in advance, and wherein the calculating further includes a preprocessing performing smoothing processing on the spectral data acquired and calculates the resin property value based on the spectral data with the smoothing processing.

* * * * *